US012098808B1

(12) United States Patent
Ruan

(10) Patent No.: US 12,098,808 B1
(45) Date of Patent: Sep. 24, 2024

(54) DECORATIVE LAMP

(71) Applicant: Lidan Ruan, Zhejiang (CN)

(72) Inventor: Lidan Ruan, Zhejiang (CN)

( * ) Notice: Subject to any disclaimer, the term of this patent is extended or adjusted under 35 U.S.C. 154(b) by 0 days.

(21) Appl. No.: 17/945,176

(22) Filed: Sep. 15, 2022

(30) Foreign Application Priority Data

Aug. 11, 2022 (CN) ......................... 202222109710.0

(51) Int. Cl.
*F21K 9/232* (2016.01)
*F21V 3/02* (2006.01)
*F21Y 103/10* (2016.01)
*F21Y 115/10* (2016.01)

(52) U.S. Cl.
CPC ................ *F21K 9/232* (2016.08); *F21V 3/02* (2013.01); *F21Y 2103/10* (2016.08); *F21Y 2115/10* (2016.08)

(58) Field of Classification Search
CPC ........ F21K 9/232; F21V 3/02; F21Y 2103/10; F21Y 2115/10
See application file for complete search history.

(56) References Cited

U.S. PATENT DOCUMENTS 8,602,610 B1 * 12/2013 Lauer ........................ F21V 9/40 362/386
2014/0145592 A1 5/2014 Goscha et al.
2014/0362586 A1 12/2014 Wu

FOREIGN PATENT DOCUMENTS

CN 201462482 U 5/2010
CN 216054579 U 3/2022

* cited by examiner

*Primary Examiner* — Evan P Dzierzynski
*Assistant Examiner* — Jessica M Apenteng

(57) ABSTRACT

The present invention relates to a decorative lamp, including a lamp cap and a light-emitting assembly. The light-emitting assembly includes a conductive wire frame and a light-emitting device. The conductive wire frame includes two long wires and a short wire; a rectangular frame is formed between the long wires and the short wire; and the light-emitting device is mounted on one long wire; and one of the long wires communicates with the electrode contact, and the other one communicates with the threaded tube. The decorative lamp has the effects of supporting the light-emitting device and conducting electricity, and is unnecessarily provided with a separate supporting frame, thereby having a simple and reasonable structure and reducing the production cost.

7 Claims, 6 Drawing Sheets

DECORATIVE LAMP

FIELD OF TECHNOLOGY

The present disclosure relates to an LED light-emitting device, and in particular to a decorative lamp.

BACKGROUND

As novel lighting products in the new century, LED products have the advantages of energy saving, high efficiency, ultralong service life, environmental protection and no pollution, and have always been pursued by everyone. However, there are not many LED lamps used in the field of decoration at present, because LED lamps for decoration are quite different from LED lamps for conventional lighting in color temperature and brightness. Moreover, the inventor found that internal LED light-emitting strips of LED lamps for decoration shown in the patent CN204141332U are complex in structure and high in production and manufacturing cost.

SUMMARY

Based on this, it is necessary to provide a decorative lamp with a simple structure and low production cost for the problem of LED lamps for decoration in the prior art.

A decorative lamp includes: a lamp cap, a transparent lampshade mounted on the lamp cap, and a light-emitting assembly mounted on the lamp cap and located in the transparent lampshade, where the lamp cap includes a main body part, an electrode contact mounted at one end of the main body part, and a threaded tube sleeved on the main body part; the light-emitting assembly includes a conductive wire frame mounted on the main body part, and a light-emitting device mounted on the conductive wire frame; the conductive wire frame includes two parallel long wires, and a short wire having two ends respectively connected to the long wires; a rectangular frame is formed between the long wires and the short wire; the light-emitting device is mounted on one long wire; and one of the long wires communicates with the electrode contact, and the other one of the long wires communicates with the threaded tube.

In the decorative lamp, since a rectangular frame is formed between the long wires and the short wire of the conductive wire frame, the light-emitting device is mounted on one of the long wires, so that the decorative lamp overally adopts a simple rectangular frame to support the light-emitting device and conduct electricity, and is unnecessarily provided with a separate supporting frame, thereby having a simple and reasonable structure and reducing the production cost.

In one of the embodiments, the light-emitting device is an LED lamp wick.

In one of the embodiments, the light-emitting device includes an LED lamp strip mounted on the long wires, and several LED lamp beads mounted on the LED lamp strip.

In one of the embodiments, the LED lamp beads are arranged along two opposite sides of the LED lamp strip.

In one of the embodiments, several cutting surfaces are arranged on an outer surface of the transparent lampshade.

In one of the embodiments, the decorative lamp further includes a projection block mounted on the long wires, where the projection block is located above the light-emitting device.

In one of the embodiments, the projection block includes a connecting block, an outer ring block arranged around the connecting block, and connecting strips respectively connected to the connecting block and the outer ring block; and a projection area with a preset shape is formed among the connecting block, the outer ring block and the connecting strips.

In one of the embodiments, the projection area is of a flower-shaped structure.

BRIEF DESCRIPTION OF THE DRAWINGS

The drawings of the specification that constitutes a part of the present application are used to provide a further understanding of the present disclosure. The exemplary embodiments of the present disclosure and the description thereof are used to explain the present disclosure, and do not constitute an improper limitation of the present disclosure. In the drawings.

DETAILED DESCRIPTION OF THE EMBODIMENTS

Figure 1:
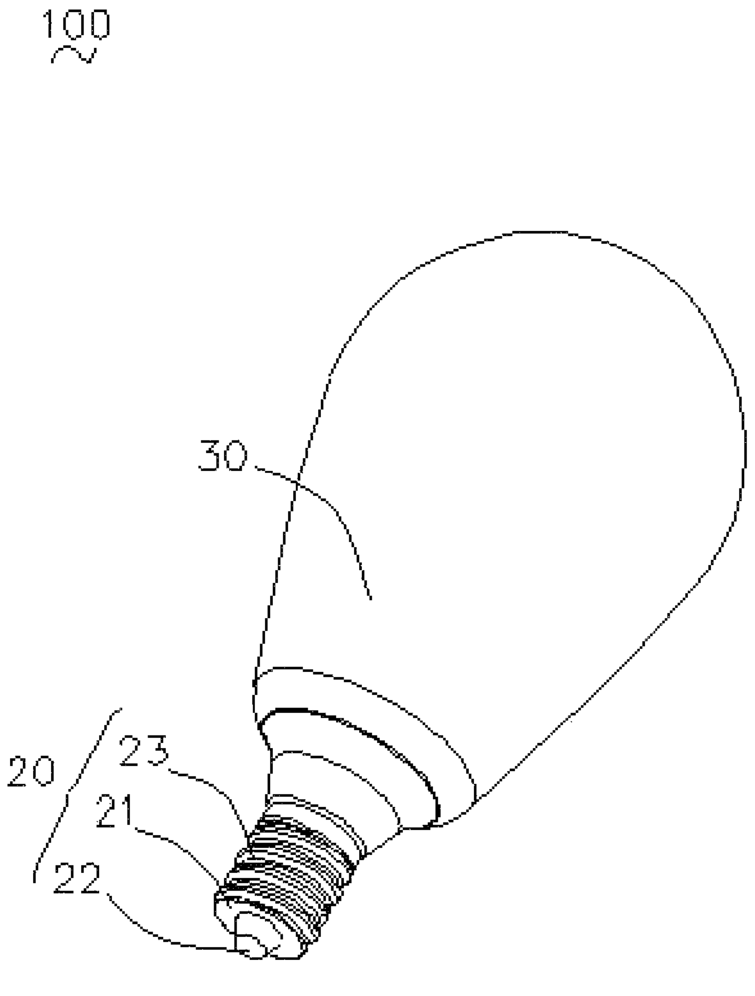
FIG. 1 is schematic diagram of a decorative lamp according to an embodiment of the present disclosure.

The present disclosure is described in detail below with reference to the accompanying drawings and the embodiments. Each example is provided to explain the present disclosure instead of limiting the present disclosure. In fact, those skilled in the art will appreciate that modifications and variations may be made in the present disclosure without departing from the scope of the present disclosure. For example, features shown or described as one part of one embodiment may be applied to another embodiment to generate yet another embodiment. Therefore, it is expected that the present disclosure includes such modifications and variations that fall within the scope of the appended claims and their equivalents.

In the description of the present disclosure, orientation or position relationships indicated by terms "longitudinal", "transverse", "upper", "lower", "front", "rear", "left", "right", "vertical", "horizontal", "top", "bottom" and the like are orientation or position relationships shown in the drawings, and these terms are merely for facilitating description of the present disclosure, but not for requiring that the present disclosure must be constructed and operated in a specific orientation, and thus, these terms cannot be understood as a limitation to the present disclosure. As used in the present disclosure, the terms "connected", "connection" and "set" should be understood in a broad sense, for example, they may be fixed connection or detachable connection, they may be direct connection or indirect connection through an intermediate part: or they may be wired connection and wireless connection, or may be connection through a wireless communication signal. For those of ordinary skill in the field, the specific meanings of the terms may be understood according to the specific conditions.

The accompanying drawings show one or more examples of the present disclosure. The detailed description uses reference numerals and letters to refer to the features in the accompanying drawings. Similar numeral references in the drawings and description have been used to refer to the similar parts in the present disclosure. As used herein, the terms “first”, “second” and “third” are used interchangeably to distinguish one component from another component, and are not intended to indicate the position or importance of individual components.

Figure 2:
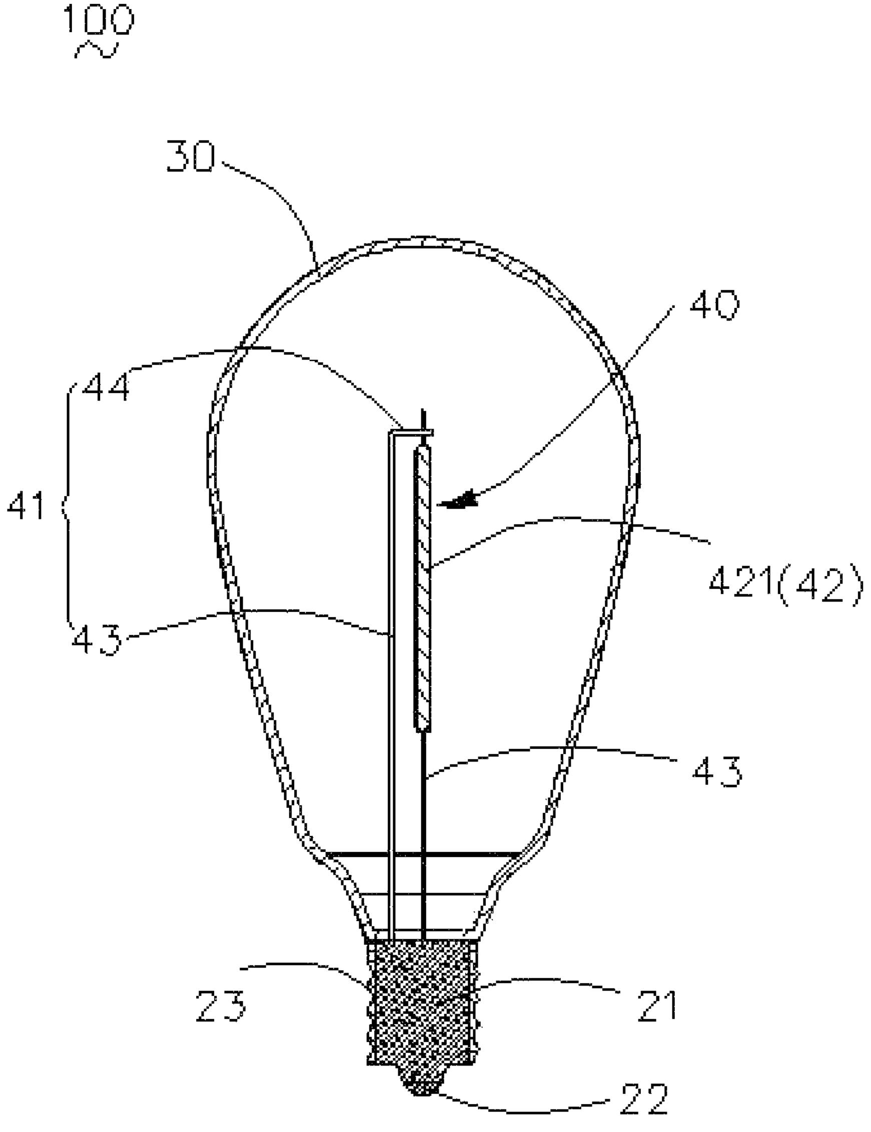
FIG. 2 is a sectional view of the decorative lamp shown in FIG. 1.
Figure 3:
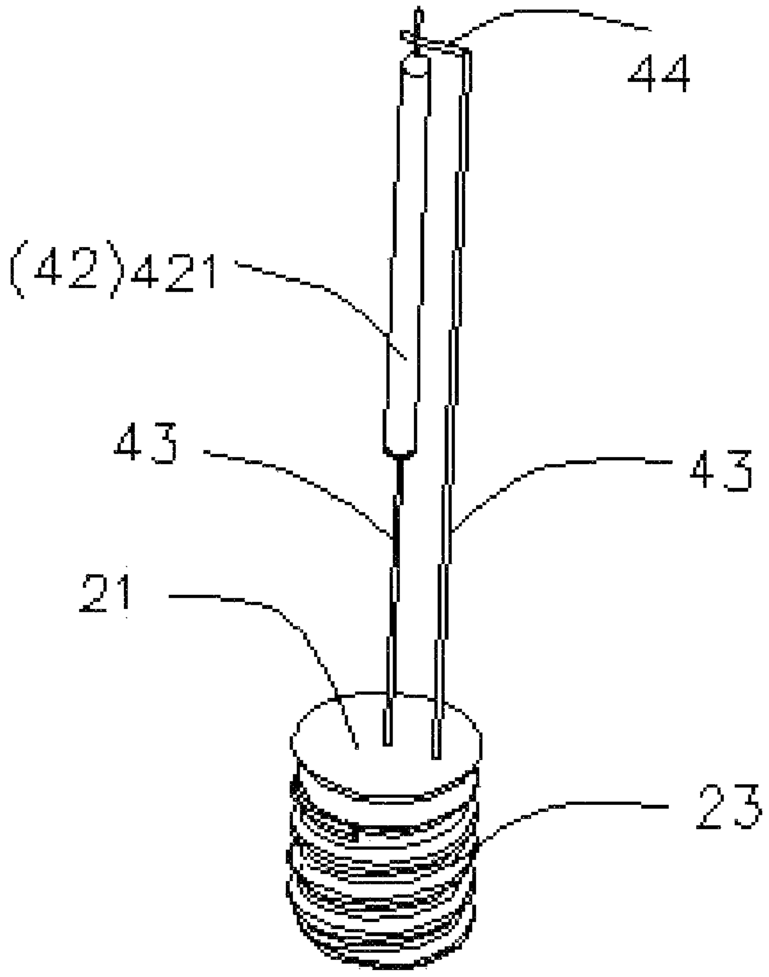
FIG. 3 is a partial schematic diagram of the decorative lamp shown in FIG. 1.

Referring to FIG. 1 to FIG. 3, which are a decorative lamp 100 according to an embodiment of the present invention, the decorative lamp 100 includes a lamp cap 20, a transparent lampshade 30 mounted on the lamp cap 20, and a light-emitting assembly 40 mounted on the lamp cap 20 and located in the transparent lampshade 30. During use, the decorative lamp is mounted on a decorative lamp string through cooperation between the lamp cap 20 and a screw base.

Further, the lamp cap 20 includes a main body part 21, an electrode contact 22 mounted at one end of the main body part 21, and a threaded tube 23 sleeved on the main body part 21. The threaded tube 23 is an E12 type screw base in the industry, thereby preventing a user from mounting the decorative lamp 100 on a normal domestic lamp holder by mistake. If the decorative lamp is mounted on the normal domestic lamp holder, there will be risks, such as short circuit, explosion and fire hazard, due to voltage difference. Therefore, the decorative lamp 100 using the E12 type screw base only can be used on a specific decorative lamp string with an E12 type screw base lamp holder, and is completely separated used separately from domestic light bulbs, thereby completely solving the potential safety hazard of the bulbs.

Figure 4:
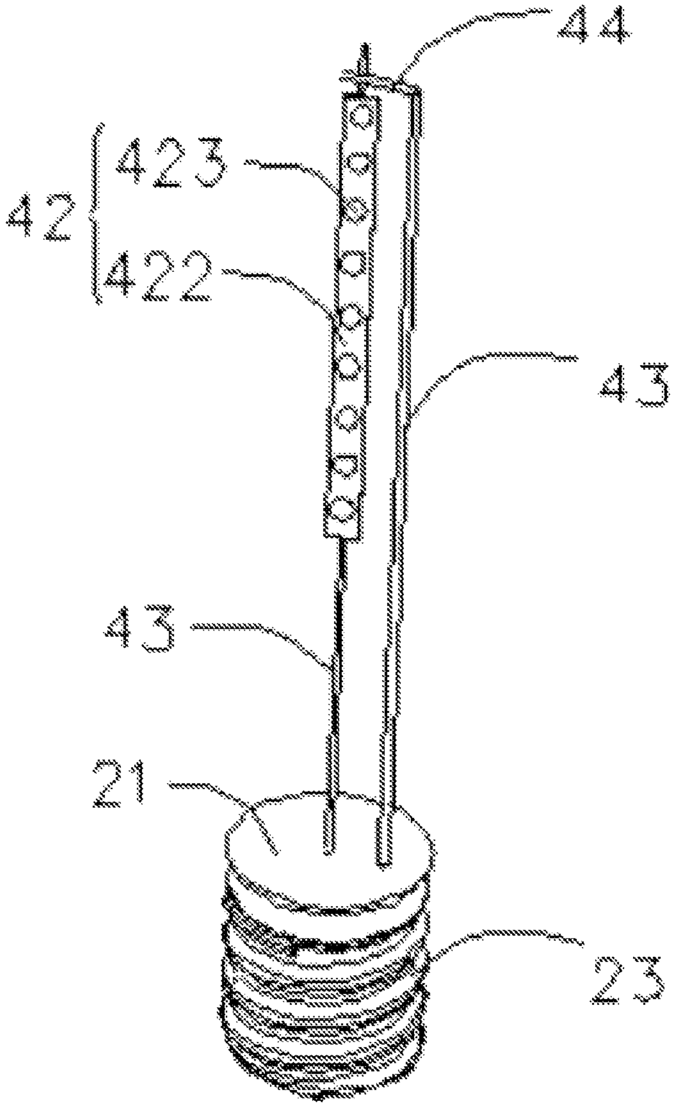
FIG. 4 is a variable embodiment of the partial schematic diagram shown in FIG. 3.

Further, the light-emitting assembly 40 includes a conductive wire frame 41 mounted on the main body part 21, and a light-emitting device 42 mounted on the conductive wire frame 41. During use, the conductive wire frame 41 communicates with an external power supply through the lamp cap 20, so that the light-emitting device 42 is energized to emit light. Further, the conductive wire frame 41 includes two parallel long wires 43, and a short wire 44 having two ends respectively connected to the long wires 43; a rectangular frame is formed between the long wires 43 and the short wire 44: the light-emitting device 42 is mounted on one long wire 43; and one of the long wires 43 communicates with the electrode contact 22, and the other one of the long wires 43 communicates with the threaded tube 23. In this embodiment, the light-emitting device 42 is an LED lamp wick 421. Referring to FIG. 4, in another embodiment, the light-emitting device 42 includes an LED lamp strip 422 mounted on the long wires 43, and a plurality of LED lamp beads 423 mounted on the LED lamp strip 422. The LED lamp beads 423 are arranged along two opposite sides of the LED lamp strip 422, and the plurality of LED lamp beads 423 are arranged at equal intervals, so that light emitted by the LED lamp beads 423 is uniform.

Figure 5:
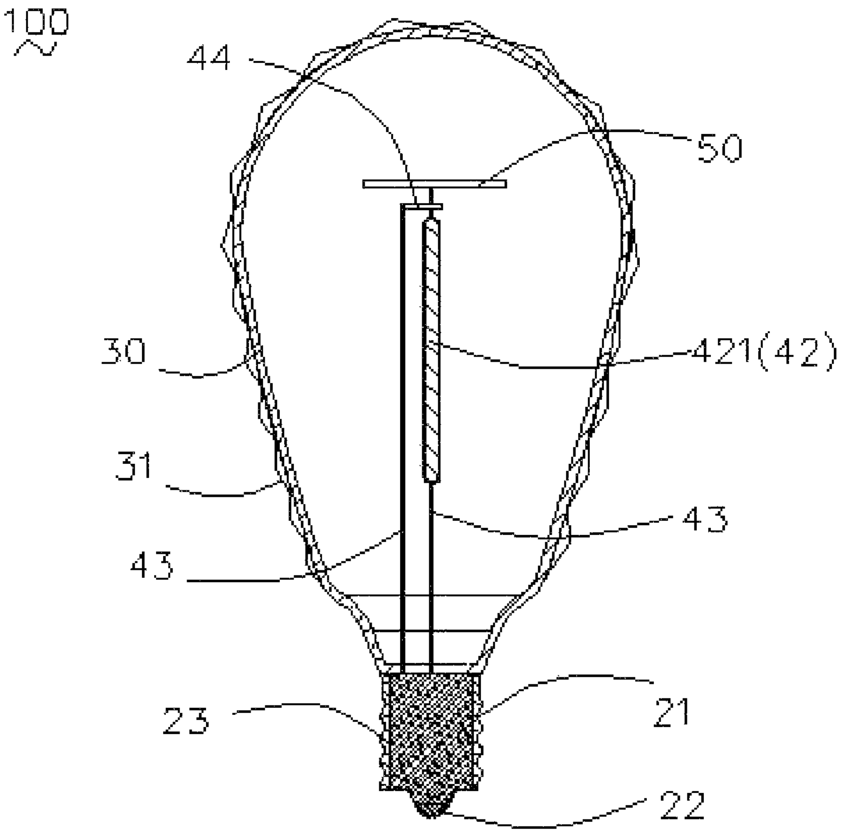
FIG. 5 is a schematic diagram of a decorative lamp according to another embodiment of the present disclosure.

Further, referring to FIG. 5, which is a schematic diagram according to another embodiment of the present invention, a plurality of cutting surfaces 31 are arranged on an outer surface of the transparent lampshade 30 of the decorative lamp 100. The cutting surfaces 31 are beneficial for the refraction of light for many times, so that light is emitted more softly and the experience comfortability is improved. The cutting surface 31 inclines at a preset angle, where the inclination angle is 20°-40°, preferably, 30°.

Figure 6:
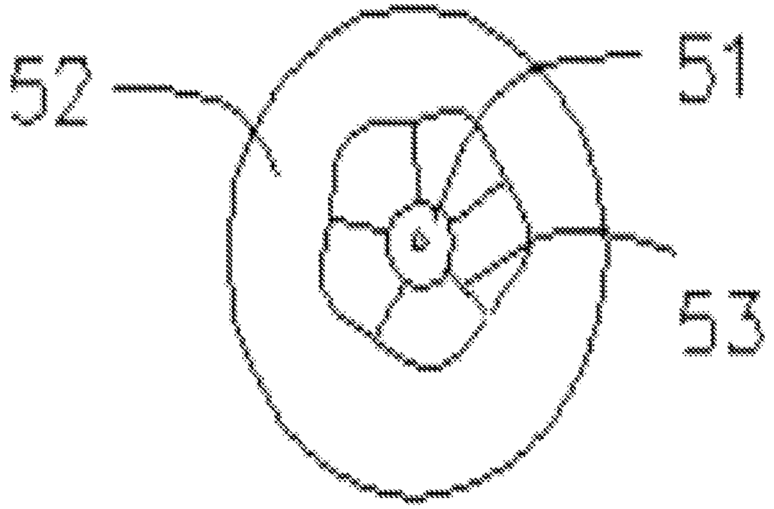
FIG. 6 is a schematic diagram of the projection block shown in FIG. 5.

Further, referring to FIG. 5 and FIG. 6, which are a schematic diagram according to another embodiment of the present invention, the decorative lamp 100 further includes a projection block 50 mounted on the long wires 43, and the projection block 50 is located above the light-emitting device 42, so that light emitted by the light-emitting device 42 in a preset direction can be irradiated by the projection block 50 to form a light diagram with a specific shape. The projection block 50 includes a connecting block 51, an outer ring block 52 arranged around the connecting block 51, and connecting strips 53 respectively connected to the connecting block 51 and the outer ring block 52; and a projection area with a preset shape is formed among the connecting block 51, the outer ring block 52 and the connecting strips 53. The projection area in this embodiment is of a flower-shaped structure, and the projected light has a corresponding flower shape and is very beautiful.

In the decorative lamp 100, since a rectangular frame is formed between the long wires 43 and the short wire 44 of the conductive wire frame 41, the light-emitting device 42 is mounted on one of the long wires 43, so that the decorative lamp overally adopts a simple rectangular frame to support the light-emitting device 42 and conduct electricity, and is unnecessarily provided with a separate supporting frame, thereby having a simple and reasonable structure and reducing the production cost.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

The above embodiments are merely illustrative of several implementations of the present invention, and the description thereof is more specific and detailed. However, these embodiments may not to be construed as a limitation to the patent scope of the present invention. It should be pointed out that several variations and improvements may be made by those of ordinary skill in the art without departing from the conception of the present invention, but such variations and improvements should fall within the protection scope of the present invention. Therefore, the patent protection scope of the present invention should be subject to the appended claims.

What is claimed is:

1. A decorative lamp, comprising:

a lamp cap, a transparent lampshade mounted on the lamp cap, and a light-emitting assembly mounted on the lamp cap and located in the transparent lampshade, wherein the lamp cap comprises a main body part, an electrode contact mounted at one end of the main body part, and a threaded tube sleeved on the main body part; the light-emitting assembly comprises a conductive wire frame mounted on the main body part, and a light-emitting device mounted on the conductive wire frame; the conductive wire frame comprises two parallel long wires, and a short wire having two ends respectively connected to the long wires; a rectangular frame is formed between the long wires and the short wire; the light-emitting device is mounted on one long wire; and one of the long wires communicates with the electrode contact, and an other one of the long wires communicates with the threaded tube;

wherein the decorative lamp further comprises a projection block mounted on the long wires, wherein the projection block is located above the light-emitting device.

2. The decorative lamp according to claim 1, wherein the light-emitting device is an LED lamp wick.

3. The decorative lamp according to claim 1, wherein the light-emitting device comprises an LED lamp strip mounted on the long wires, and several LED lamp beads mounted on the LED lamp strip.

4. The decorative lamp according to claim 3, wherein the LED lamp beads are arranged along two opposite sides of the LED lamp strip.

5. The decorative lamp according to claim 1, wherein several cutting surfaces are arranged on an outer surface of the transparent lampshade.

6. The decorative lamp according to claim 1, wherein the projection block comprises a connecting block, an outer ring block arranged around the connecting block, and connecting strips respectively connected to the connecting block and the outer ring block; and a projection area with a preset shape is formed among the connecting block, the outer ring block and the connecting strips.

7. The decorative lamp according to claim 6, wherein the projection area is of a flower-shaped structure.

* * * * *